3,707,493
COMPOUND 3-(p-BROMOPHENYL)-1-METHYL-1-METHOXYUREA

Rayner S. Johnson, Carrcroft, Wilmington, Del., assignor to E. I. du Pont de Nemours and Company, Wilmington, Del.
No Drawing. Continuation-in-part of abandoned application Ser. No. 301,981, Aug. 14, 1963, which is a continuation-in-part of abandoned application Ser. No. 64,254, Oct. 24, 1960, which in turn is a continuation-in-part of abandoned application Ser. No. 733,213, May 5, 1958. This application Apr. 10, 1964, Ser. No. 358,947

Int. Cl. C07c 127/18
U.S. Cl. 260—453 R            1 Claim

ABSTRACT OF THE DISCLOSURE

The compound 3-(p-bromophenyl) - 1 - methyl-1-methoxyurea, useful in weed control.

---

This application is a continuation-in-part application of my then copending application Ser. No. 301,981, filed Aug. 14, 1963 (now abandoned) which was a continuation-in-part application of my then copending application Ser. No. 64,254, filed Oct. 24, 1960 (now abandoned) which was a continuation-in-part application of my then copending application Ser. No. 733,213, filed May 5, 1958 (now abandoned).

This invention relates to compounds exhibiting herbicidal properties. It is more particularly directed to a method of selectively controlling weeds growing in crop lands by applying to an area of weed growth a herbicidally effective amount of 3 - (p-bromophenyl)-1-methyl-1-methoxyurea, 3-(3,4-dibromophenyl) - 1 - methyl-1-methoxyurea or 3 - (3-bromo-4-methylphenyl)-1-methyl-1-methoxyurea.

German Pat. 1,062,059 generically covers the use of the compounds of this invention as applied to weeds.

I have found that three compounds within the scope of the German patent have particularly outstanding selective action on various weeds without corresponding injury to desirable plants. This selective activity is not possessed by other compounds specifically mentioned in this patent. The compounds used in my invention can be used in fields of corn and potatoes in order to control such weeds as crabgrass, foxtail, watergrass, Johnson grass seedlings, purslane, pigweed, cockleburr, velvet-leaf, annual morning glory, lambsquarters and ragweed. Excellent results are achieved by using any of the three compounds in potato fields. Weeds are destroyed without injuring the potatoes.

Compounds used in this invention can be formulated with surfactants of the anionic, cationic or non-ionic type. Surfactants that can be used with the compounds set forth above are sodium or amine salts of alkylbenzene sulfonic acids, and of sulfated alcohols, long chain acid esters of sodium isethionate, esters of sodium sulfosuccinate, sulfated or sulfonated fatty acid esters, acetylenic glycols, methyl cellulose, polyvinyl alcohol, polymeric alkylnaphthalene sulfonates, sodium alkylnaphthalene sulfonate, polymethylene bisnaphthalene sulfonates and sodium N-methyl-N-(long chain acid)taurates. Other surfactants include alkylaryl polyethoxy alcohols, alkyl polyethoxy alcohols, sorbitol fatty acid esters and their reaction products with ethylene oxide, polyoxyethylene fatty esters, fatty alkylol amide condensates, sodium and potassium oleate, amine salts of oleic acid such as morpholine and dimethylamine chelates, sulfonated animal and vegetable oils such as sulfonated fish or castor oils, sulfonated petroleum oils, sulfonated acyclic hydrocarbons, sodium, calcium or magnesium salts of lignin sulfonic acid and other wetting, dispersing and emulsifying agents such as those listed in "Detergents and Emulsifiers—Up to Date" 1963 by John W. McCutcheon, Inc.

Generally, the surface-active agent will be present in herbicidal concentrates employing the compounds used in this invention at the rate of 0.1 to 20% by weight of the total composition.

Additional surface-active agents can be added to the above formulation to increase the ratio of surface-active agent to active agent up to as high as 5:1 by weight. The addition of higher rates of surface-active agent increases the herbicidal effectiveness of the active compounds. At high rates, it is preferred that the surface-active agents be present in the range of ⅕ to 5 parts surfactant for each one part of active compound.

Herbicidal compositions are applied either as a spray, granule, pellet or duct to the locus or area to be protected from undesirable plant growth, commonly called weeds, i.e., plants growing where they are not wanted. Such application can be made directly upon the locus or area and the weeds thereon during the period of weed infestation in order to destroy the weeds but if desired the application can be made in advance of an anticipated weed infestation to prevent such infestation. Thus the compounds used in this invention can be applied as aqueous foliar sprays or as dry sprays applied directly to the soil. Alternatively, dry powder compositions can be dusted directly on the plants or on the soil.

Application of granules is an effective method of obtaining pre-emergence control of weeds with minimum injury to foliage of desired crop plants. Application of pellets whether by hand or machine applicators is an effective method of obtaining complete kill of undesirable plant growth in fence rows, under power lines, etc.

The active compounds are, of course, applied in amounts sufficient to exert the desired herbicidal action. The amount of the herbicidally active ingredient present in the composition as actually applied to destroy, prevent or control weeds will vary with the manner of application, the particular weeds for which control is sought, the purposes for which the application is being made and like variables.

In general, the herbicidal compositions as applied in the form of spray, granule, pellet or a dust will contain from about 0.5 to 85% by weight of herbicidally active ingredient amounting to about 0.5 to 10 pounds per acre of active ingredient.

Fertilizer materials, other herbicidal agents, other pest control agents such as insecticides and fungicides as well as common pesticidal diluents can be included in the herbicidal compositions of the invention.

The use of the three compounds in this invention are further illustrated by the following examples. The indicated percentages are by weight.

EXAMPLE 1

| | Percent |
|---|---|
| 3-(p-bromophenyl)-1-methyl-1-methoxyurea | 40.00 |
| Alkylnaphthalene sodium sulfonate | 1.75 |
| Low viscosity methyl cellulose | 0.25 |
| Attapulgite clay | 58.00 |

This formulation is prepared by blending the ingredients and then grinding, first in a hammer mill and then in a fluid energy mill. The composition is used for a combination of pre-emergence and post-emergence weed control treatment in potato fields. The mixture at a rate of 3 pounds of herbicidal active ingredient per acre in 45 gallons of water is applied to an emerged stand of foxtail, crabgrass, Johnson grass, pigweed and lambsquarters. Excellent weed control is obtained with extended residual weed control until the potato leaves shade most of the soil area.

EXAMPLE 2

| | Percent |
|---|---|
| 3-(3,4-dibromophenyl)-1-methyl-1-methoxyurea | 24.00 |
| Sodium lignin sulfonate | 15.00 |
| Hydrated attapulgite | 1.75 |
| Sodium pentachloride phenate | 0.70 |
| Disodium phosphate | 0.90 |
| Water | 57.65 |

The above components are mixed together in a pebble mill or sand mill until the insoluble components are substantially all below 5 microns in particle size.

This formulation is used at the rate of 2.5 pounds of active ingredient per acre in 40 gallons of water for both pre- and direct post-emergence application in corn. Seedling weeds present in the growing crops are killed and good residual weed control is obtained. Crabgrass, foxtail, seedling Johnson grass, pigweed, velvet-leaf, flower-of-an-hour and many other weeds are controlled with good growth of the crop.

EXAMPLE 3

| | Percent |
|---|---|
| 3-(3-bromo-4-methylphenyl)-1-methyl-1-methoxyurea | 75.00 |
| Dodecylbenzenesulfonic acid, sodium salt | 1.75 |
| Sodium lignin sulfonate | 1.00 |
| Diatomaceous silica | 22.25 |

The above components are blended and micropulverized until substantially all particles are below 50 microns.

This mixture is applied pre-emergence at the rate of 3 pounds of herbicidally active ingredient per acre to a field of potatoes. Excellent control is obtained of crabgrass, foxtail, barnyard grass, pigweed, chickweed and annual bluegrass. There is no injury to the potatoes.

The invention claimed is:

1. The compound of the formula

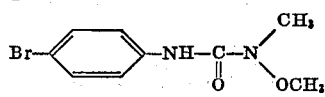

References Cited

UNITED STATES PATENTS

| 2,709,648 | 5/1955 | Ryker et al. | 71—2.6 |
| 2,726,150 | 12/1955 | Wolter | 71—2.6 |
| 3,079,244 | 2/1963 | Scherer et al. | 71—2.6 |
| 3,084,192 | 4/1963 | Smathers | 71—2.6 X |
| 3,127,263 | 3/1964 | Johnson | 71—2.6 |
| 3,165,549 | 1/1965 | Martin et al. | 71—2.6 X |

FOREIGN PATENTS

| 1,062,059 | 6/1959 | Germany | 71—2.6 |

JOSEPH P. BRUST, Primary Examiner

U.S. Cl. X.R.

71—120